Figure 2:
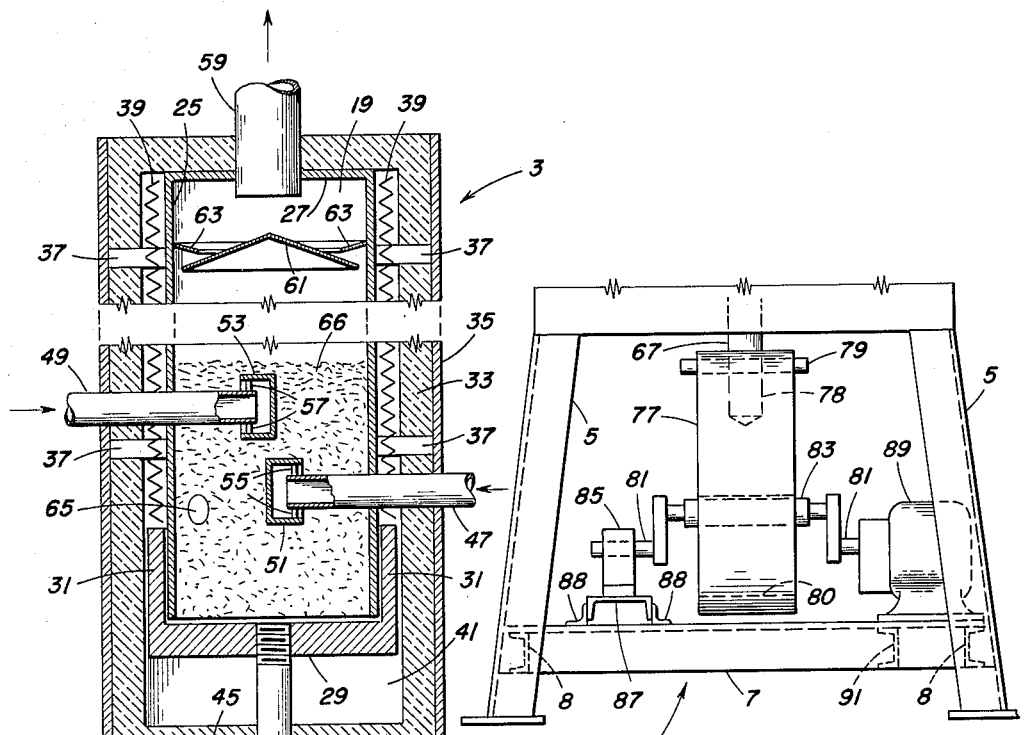

April 12, 1966     R. L. McBRAYER     3,245,673
REDUCTION APPARATUS
Filed June 18, 1962

INVENTOR
Robert L. McBrayer
BY *Bernhard R. Swick*
ATTORNEY

United States Patent Office 3,245,673
Patented Apr. 12, 1966

3,245,673
REDUCTION APPARATUS
Robert L. McBrayer, Lincoln Park, Mich., assignor to Wyandotte Chemicals Corporation, Wyandotte, Mich., a corporation of Michigan
Filed June 18, 1962, Ser. No. 204,661
5 Claims. (Cl. 266—24)

This application is a continuation-in-part of patent application Serial No. 185,942, filed April 9, 1962 and now abandoned.

This invention relates to the production of metals and, more particularly to the production of elemental refractory metals, particularly metals of the group niobium, tantalum, molybdenum and tungsten.

The production of such metals by reducing a halide thereof with hydrogen is already known. In accordance with prior art practice, niobium pentachloride has been reduced with hydrogen to deposit an integrally bonded metallic coating on a dissimilar metal base. However, due to the presence of the dissimilar metal base, this is not adaptable for use in preparing pure elemental metals. In addition, elemental niobium is produced in the pure state by reacting a cloride of niobium such as the pentachloride with hydrogen, effecting the reaction in a closed, heated reaction zone and in the reduction charging the chloride in a fluidized bed suspension of finely divided, pure niobium particles maintained in ebullient motion in the reaction zone by the controlled flow of the hydrogen reducing agent being fed into the zone, depositing the elemental niobium product formed on the suspended niobium particles, removing reaction by-products and unreacted hydrogen from the bed and reaction zone and withdrawing from the zone for recovery the large niobium metal particles formed therein as a result of the reduction and deposition.

This practice has certain inherent disadvantages in that it requires a large excess of the hydrogen over the amount required to completely reduce the chloride in order to have enough gas for fluidization of the bed of particles. While an inert gas may be mixed with the hydrogen to provide a rate of flow sufficient to fluidize the particles, the use of an inert gas has inherent disadvantages since it requires either large quantities of expensive inert gas or necessitates separating the inert gas from the other gases resulting from the reaction, thus requiring expensive separation operations and equipment.

Accordingly, it is the purpose of this invention to provide a method for producing a refractory metal, particularly a metal selected from the group consisting of niobium, tantalum, molybdenum and tungsten by reducing a compound of the metal with a gaseous reducing agent wherein the amount of excess reducing agent required is substantially reduced without the addition of an inert gas to the reducing agent gas stream.

Figure 1:
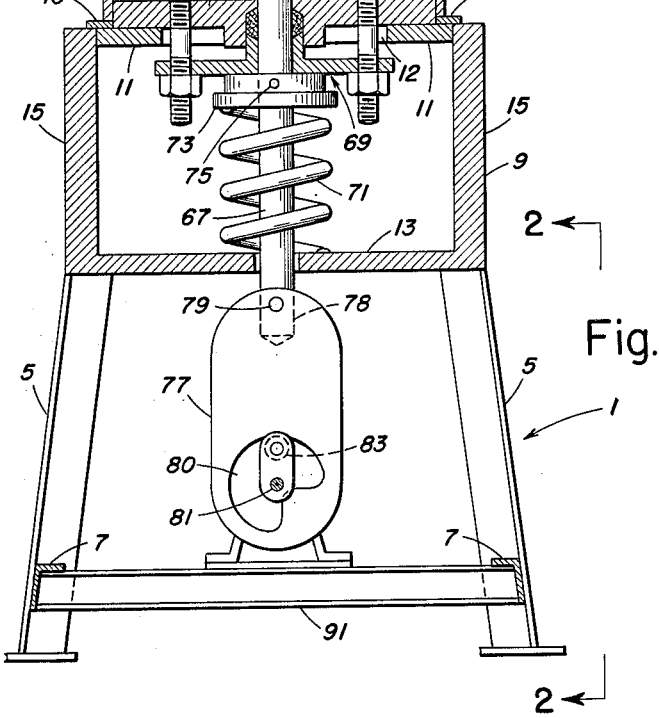

This invention is best described with reference to the accompanying drawings wherein:

FIGURE 1 is an elevational view, in section, of a presently preferred reaction apparatus embodying the principles of this invention, and FIGURE 2 is a fragmentary elevational view of the lower portion of the reaction apparatus of FIGURE 1 taken along the line 2—2 of FIGURE 1.

With reference now more particularly to the drawing, it will be seen that the reaction apparatus comprises a suitable support structure indicated generally at 1 and a reactor indicated generally at 3 mounted on support structure 1. Support structure 1 generally comprises a plurality of upstanding members 5, horizontal members 7 and 8 and a channel member 9 having vertical side flanges 15 and a web 13 affixed to the upper ends of members 5. A plate 11 provided with a large opening 12 is affixed to the upper ends of the side flanges 15 of channel member 9. In lieu of a channel member 9 as shown, conventional vertical members similar to members 5 may be substituted for the vertical sides 15 of channel 9 and a bottom plate member affixed to the side members may be substituted for the web 13 of channel member 9. These various members are assembled together as shown in the drawings by suitable means such as welding to provide the support structure 1.

Reactor 3 has a reaction chamber 19 defined therein and comprises an inner tubular member 25 having a closure member such as a circular metal plate 27 provided on the upper end thereof. A vertically movable piston 29 is provided which cooperates with tubular member 25 to form the bottom of reaction chamber 19. A flange 31 is provided on piston 29 which coacts with the outer surface of inner tubular member 25 to prevent escape of material. While the reaction chamber 19 is described as being circular in cross-section, other shapes such as rectangular or square may be employed. The major upper portion of tubular member 25, plate 27 and the horizontal portion of piston 29 are fabricated from any suitable material such as "Inconel" which possesses adequate strength and which is nonreactive with respect to the reactants. Wrought "Inconel" comprises 79.5% nickel, 13.0% chromium, 6.5% iron, 0.25% manganese, 0.25% silicon, 0.08% carbon and 0.20% copper. Cast "Inconel" comprises 77.75% nickel, 13.50% chromium, 6.00% iron and 0.25% silicon. The lower end of tubular member 25 and the flange 31 of piston 29, which are subject to wear by the reciprocating movement of the piston 29 and abrasive action by the particles of the refractory material which may work their way between the moving surfaces, must be resistant to such abrasive action. A suitable material for these wearing parts is tungsten. In lieu of employing a flange 31 on piston 29 which engages the outer surface of tubular member 25, the piston 29 may be of a diameter substantially the same as the inside diameter of tubular member 25 and engage the inside surface of tubular member 25. In any event, the piston must be so designed as to be vertically movable and yet close off the lower end of reaction chamber 19 in any position.

Suitable heating means such as electrical resistance elements indicated diagrammatically at 39 are provided around the outer surface of tubular member 25 and thus are adapted to heat the reaction chamber 19. The reactor 3 is provided with suitable heat insulation 33 such as fiberglass, rock wool, etc. and an outer shell 35 which preferably is of heat reflective material and which, in any event, is of sufficient strength to support the tubular member 25. In order to provide such support for tubular member 25, suitable members such as metal bars, e.g. steel bars, 37 are provided between shell 35 and tubular member 25 and are firmly affixed to both the shell and the tubular member by suitable means such as welding.

A suitable material for outer shell 35 would be steel clad on the inside with a thin layer of polished aluminum. While insulation 33 closely surrounds piston member 29, tubular member 25 and electrical resistance elements 39 and is adjacent to plate 27 on top of the reactor 3, an adequate space 41 is provided below the lower end of tubular member 25 to permit vertical movement of piston member 29.

Outer shell 35 is provided with a suitable flange 43 and is mounted on the top of supporting structure 1 by suitable means such as welding. A circular plate member 45 is provided at the bottom of outer shell 35 and is affixed thereto by suitable means such as welding.

Suitable conduits 47 and 49 are provided for conducting the gaseous reducing agent and the metal compound which is generally in the vapor state into reaction chamber 19. Cap-type baffle members 51 and 53 are affixed to the ends of conduits 47 and 49 respectively by means of lugs 55 and 57 and serve as distributors to more evenly distribute the gaseous reactants into the reaction chamber and, in addition, prevent particles of the desired metal present in the chamber 19 from entering conduits 47 and 49. A suitable outlet conduit 59 for gaseous material produced by the reduction reaction is provided in the upper end of reaction chamber 19. Baffles 61 and 63 are provided just below conduit 59 to prevent metal particles from entering conduit 59 and yet permit gaseous material produced by the reaction to pass out through conduit 59.

A body of the desired elemental metal in particulate form is provided in reaction chamber 19 and is supplied thereto and removed therefrom through an opening 65 in the side thereof and a conduit (not shown). Where the opening 65 is small as shown, the metal particles may be introduced with a stream of a gas such as argon. The particles may be removed from the chamber through opening 65 by applying pressure with a similar gas through outlet 59 and/or conduits 47 and 49. Suitable valves (not shown), or other closing means, are provided for all inlets or outlets for reaction chamber 19. While the particles below the opening 65 will not be removed, the major portion of the particles will be removed and this permits introduction of a substantial amount of smaller particles upon which metal may be deposited.

If desired, a removable top may be provided on reactor 3 whereby the particles may be introduced or removed. Means are provided for rapidly reciprocating the piston 29 in order to produce an agitated bed 66 of the metal particles providing spacing between the particles, thereby preventing sintering of the particles and facilitating passage of the gaseous reducing agent through the particles and contact of the gas with all surfaces of all particles for better reaction efficiency and deposition of the metal on the particles. For best agitation of the particles, it is preferred to rapidly reciprocate the piston 29 in a manner to produce an upward stroke which is very sharp or very rapid and substantially more rapid than the downward stroke whereby an action of throwing the particles upward is achieved. The reciprocation of the piston 29 is achieved through a connecting rod 67 attached to the bottom of the piston by suitable means such as threading. A conventional stuffing box indicated generally at 69 is provided for passage of connecting rod 67 through the bottom of reactor 3.

A resilient means and more specifically a spring 71 adapted to urge the piston upwardly is provided which supports the piston in its uppermost position as shown in FIGURE 1 when no force is applied in the downward direction. For this purpose, a collar 73 is affixed to connecting rod 67 by means of a pin 75 and spring 71 is positioned between collar 73 and web 13. Spring 71 is of sufficient length in the unstressed condition to be slightly compressed when in position in the apparatus as shown in FIGURE 1.

A cam member 77 provided with an opening 78 in the upper end thereof and having a diameter substantially the same as that of connecting rod 67 to permit insertion of the end of rod 67 is affixed to the lower end of connecting rod 67 by means of a pin 79. Cam member 77 is provided with a cam surface formed by an opening 80 in cam member 77. A rotatable crankshaft 81 provided with a crank 83 which passes through opening 80 and is mounted at one end in a suitable bearing 85 which in turn is mounted on a horizontal member 87 affixed by means of angle members 88 to horizontal members 7 by suitable means such as welding. The opposite end of crankshaft 81 is attached to a suitable means for rotating the crankshaft such as a motor 89 which is suitably mounted on one of the horizontal members 8 and a horizontal member 91 of supporting structure 1. The crank 83 engages the cam surface of cam member 77 which has a configuration such that upon rotation of crankshaft 81 connecting rod 67 and piston member 29 are alternately moved downward against the force of spring 71, and upon completion of the downward stroke the connecting rod 61 and piston 29 are suddenly released from the action of the crank 83 whereby they are rapidly moved upward by the force of the spring 71.

The method embodying the principles of this invention and the operation of the apparatus described above and shown in the drawing is as follows.

A body of the desired metal in particulate form is charged into the reaction chamber 19 through opening 65 by means of a stream of argon gas. The crankshaft 81 is then rapidly rotated by means of motor 89, thereby rapidly reciprocating the piston 29 which forms the lower or bottom inside surface of the reaction zone, i.e. chamber 19, agitating the body of metal. The reaction chamber 19 is heated by means of resistance elements 39 to a temperature ranging from 600–1200° C. and maintained at the temperature by the resistance elements. The gaseous reducing agent is fed into the reaction chamber 19 through lower conduit 47. The metal compound is introduced into the chamber through upper conduit 49 and thus the gaseous reducing agent is passed into contact with a compound of the metal in the reaction zone or chamber 19 in the presence of the agitated body of the desired metal in particulate form to effect reduction of the compound, thereby producing the pure metal and gaseous products or material.

In general, it is necessary to employ an amount of gaseous reducing agent in excess of the theoretical amount required in order to completely reduce the metal compound. Thus, where the metal compound is a halide, it is necessary to employ an amount of reducing agent in excess of the stoichiometric equivalent of the halogen content of the metal halide in order to completely reduce the halide to the pure metal. While the desired results may be obtained with a large excess, only a relatively small excess is required and any greater amounts would serve no useful purpose and thus are undesirable from the economic point of view. Where the compound is the chloride, the gaseous reducing agent is hydrogen and the metal is niobium, tantalum or molybdenum, the following reduction reaction generally takes place in the reaction zone or chamber 19:

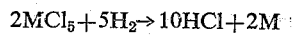

$$2MCl_5 + 5H_2 \rightarrow 10HCl + 2M$$

the letter M representing the metal niobium, tantalum or molybdenum. In this instance, it is preferred to employ an amount of hydrogen ranging from about two to twenty times the theoretical amount required by the above equation although higher or lower amounts may be employed if desired. Where the metal is tungsten, generally the following reaction takes place in the reaction zone:

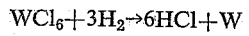

$$WCl_6 + 3H_2 \rightarrow 6HCl + W$$

In the above instance where the metal is tungsten, hydrogen in an amount ranging from one to about four times the theoretical amount required by the above equation is preferred although greater amounts may be employed if desired. The desired metal in solid form and gaseous material comprising HCl and excess hydrogen is produced by the above reduction reactions. The metal formed in the reduction is deposited upon the surface of the metal particles. The enlarged metal particles are periodically removed through opening 65 by applying pressure to reaction chamber 19 by means of argon gas introduced through conduit 59. The gaseous material resulting from the reaction passes around baffles 61 and 63 and exits through outlet conduit 59.

The following are examples illustrating the practice of this invention.

Example I 6700 grams of 99.99% pure niobium powder having the particle size in the fraction which passes through a 60 mesh screen and is retained on a 200 mesh screen are charged to a reactor of the type shown in FIGURE 1. The particles are introduced through the opening in the side of the reactor by a stream of argon gas. The portions of the piston and the tubular member which contact each other are fabricated from tungsten while the remaining portions of the reaction chamber are fabricated from "Inconel." The reaction chamber has an inside diameter of 4.026" and is 36" long with the piston in its uppermost position. The piston has a travel of 1". The conduits for introducing the gaseous reactant materials are 0.5" I.D., the lower conduit is positioned 2" from the bottom of the inner tubular member and the other conduit is positioned 1" from the lower conduit. The conduits and baffle members are fabricated from "Inconel."

The niobium particles are agitated by reciprocation of the piston through rotation of the crankshaft at 60 r.p.m. by means of a ¼ horsepower, 115 volt, variable speed, alternating current electric motor. The reaction chamber is maintained at a temperature of 800° C. by heat from the electrical resistance elements. Hydrogen at a temperature of 800° C. is passed into the reaction chamber through the lower conduit at a rate of 1.02 standard cubic feet per minute. Niobium pentachloride vapor at a temperature of 300° C. is fed to the reactor at a rate of 8.65 grams per minute. With the niobium pentachloride being fed at 8.65 grams per minute and the hydrogen being fed into the reaction chamber at 1.02 standard cubic feet per minute, fifteen times the stoichiometric amount of hydrogen is reacted with the niobium pentachloride. Reduction occurs within the agitated bed of niobium paricles with the pure niobium product depositing on the particles. The gaseous material produced by the reaction which comprises hydrogen chloride, excess hydrogen and partially reacted $NbCl_5$ exits through the outlet in the upper portion of the reactor at a rate of about 1.1 standard cubic feet per minute. The above procedure is carried out for a period of 300 minutes. The increase in weight of the niobium body at the termination of this run is 805 grams, which indicates 90% recovery of the niobium as metal from the niobium pentachloride fed to the reactor. The particles are removed from the reaction chamber through the opening in the side thereof by applying pressure with argon gas entering through the conduit in the top of the reaction chamber.

Example II 7500 grams of 99.99% pure tungsten powder having a particle size in the fraction which passes through a 60 mesh screen and is retained on a 100 mesh screen are charged to the reactor described in Example I and agitated. The reaction chamber is maintained at a temperature of 725° C. by heat from the electrical resistance elements. Hydrogen at a temperature of 725° C. is passed into the reaction chamber through the lower conduit at a rate of 0.16 standard cubic foot per minute. Tungsten hexachloride vapor at a temperature of 370° C. is fed to the reactor at a rate of 8.35 grams per minute. With the tungsten hexachloride being fed at 8.35 grams per minute and the hydrogen being fed into the reaction chamber at 0.16 standard cubic foot per minute, three times the stoichiometric amount of hydrogen is reacted with the tungsten hexachloride. Reduction occurs within the agitated bed of tungsten particles with the pure tungsten product depositing on the particles. The gaseous material produced by the reaction which comprises hydrogen chloride, excess hydrogen and partially reacted $WCl_6$ exits through the outlet in the upper portion of the reactor at a rate of about 0.22 standard cubic foot per minute. The above procedure is carried out for a period of 270 minutes. The increase in weight of the tungsten body at the termination of this run is 1000 grams, which indicates 96% recovery of the tungsten as metal from the tungsten hexachloride fed to the reactor.

Example III 6400 grams of 99.99% pure tantalum powder having the particle size in the fraction which passes through a 60 mesh screen and is retained on a 200 mesh screen are charged to the reactor described in Example I and agitated. The reaction chamber is maintained at a temperature of 850° C. by heat from the electrical resistance elements. Hydrogen at a temperature of 850° C. is passed into the reaction chamber through the lower conduit at a rate of 0.66 standard cubic foot per minute. Tantalum pentachloride vapor at a temperature of 260° C. is fed to the reactor at a rate of 5.55 grams per minute. With the tantalum pentachloride being fed at 5.55 grams per minute and the hydrogen being fed into the reaction chamber at 0.66 standard cubic foot per minute, twenty times the stoichiometric amount of hydrogen is reacted with the tantalum pentachloride. Reduction occurs within the agitated bed of tantalum particles with the pure tantalum product depositing on the particles. The gaseous material produced by the reaction which comprises hydrogen chloride, excess hydrogen and partially reacted $TaCl_5$ exits through the outlet in the upper portion of the reactor at a rate of about 0.7 standard cubic foot per minute. The above procedure is carried out for a period of about 300 minutes. The increase in weight of the tantalum body at the termination of this run is 705 grams, which indicates 84% recovery of the tantalum as metal from the tantalum pentachloride fed to the reactor.

It is to be understood that various changes and modifications may be made in the foregoing apparatus and method of operation without departing from the spirit of the invention and scope of the appended claims.

What is claimed is:

1. An apparatus for reducing a compound of a metal with a gaseous reducing agent comprising a reactor having a reaction chamber defined therein, a movable piston member forming the bottom of said chamber, a body of said metal in particulate form provided in said chamber, means for introducing said metal in particulate form into said chamber and for removing said metal from said chamber, means for rapidly reciprocating said piston member wherein the upward stroke is substantially more rapid than the downward stroke and means for introducing said gaseous reducing agent and said metal compound into said chamber.

2. The apparatus of claim 1 wherein said means for rapidly reciprocating said piston comprises a resilient means adapted to urge said piston upwardly and a means adapted to alternately move said piston downwardly against the force of said resilient means and release said piston whereby it is rapidly moved upwardly by the force of said resilient means.

3. The apparatus of claim 2 wherein said resilient means is a spring and said means adapted to alternately move said piston downwardly and release said piston comprises a coacting cam means attached to said piston, a rotatable crankshaft adapted to engage said cam means and means for rotating said crankshaft.

4. The apparatus of claim 3 including means for heating said chamber.

5. The apparatus of claim 4 including outlet means for said chamber.

(References on following page)

References Cited by the Examiner

UNITED STATES PATENTS

| | | | |
|---|---|---|---|
| 2,631,091 | 3/1953 | Kuentzel et al. | 159—98 X |
| 2,637,625 | 5/1953 | Garbo | 23—2.1 |
| 2,766,033 | 10/1956 | Priscu et al. | 266—17 |
| 2,874,040 | 2/1959 | Ferraro | 75—84.5 |
| 3,022,159 | 2/1962 | Howard et al. | 75—84.5 |
| 3,039,755 | 6/1962 | Mehal | 266—19 |
| 3,070,837 | 1/1963 | Loertscher et al. | 264—7 |
| 3,099,493 | 7/1963 | De Hart et al. | 307—29 |

JOHN F. CAMPBELL, *Primary Examiner.*

MARCUS U. LYONS, MORRIS O. WOLK, *Examiners.*